United States Patent

[11] 3,542,479

[72] Inventor Dan Sibalis
Brooklyn, New York
[21] Appl. No. 703,100
[22] Filed Feb. 5, 1968
[45] Patented Nov. 24, 1970
[73] Assignee Berkey Photo, Inc.
New York, New York

[54] DENSITOMETER
10 Claims, 4 Drawing Figs.
[52] U.S. Cl. .................................................. 356/202,
250/217
[51] Int. Cl. ...................................................... G01n 21/06;
E04g 17/06
[50] Field of Search ........................................ 356/231,
202, 206; 250/218, 217, 229

[56] References Cited
UNITED STATES PATENTS
3,354,773 11/1967 Shreve ......................... 356/47
OTHER REFERENCES
"Colorimetry"; Albert A. Shurkus; Radio News, June 1944.

Primary Examiner—Ronald L. Wibert
Assistant Examiner—Conrad Clark
Attorney—Edward T. Connors ABSTRACT: An instrument is disclosed for measuring the reflectance or the density of an article, or either of these characteristics. Under operation to measure reflectance a variable light source is positioned to illuminate the article, the light being transmitted to the article by an apertured mirror. First light-responsive means is positioned so as to receive light reflected from the article through the aperture. Control means is used to vary the light source output to a predetermined value, the control means being actuated by the first light-responsive means. A second light-responsive means is positioned to receive light from the source and to control indicating means the reading of which is related to the intensity of light reflected from the article.

Under operation to measure density, the first light-responsive means is positioned to receive light transmitted through the article and the meter indicates the intensity of light passed through the article.

In a construction to measure either reflectance or density a pair of light-responsive means is provided, one being positioned to receive light reflected through the apertured mirror, the other being positioned to receive light transmitted through the article, the pair of light-responsive means being connected through a double throw switch for alternative use.

Patented Nov. 24, 1970 3,542,479

INVENTOR.
DAN SIBALIS
BY Edward F. Connors
Attorney

DENSITOMETER

The present invention relates to an instrument termed herein a densitometer and which is suitable for measuring the optical density of photographic film or the like or for measuring light reflected from the surface of an article such as a print, or from a surface on which is projected an image such as an enlarging easel. The densitometer thus may provide a measurement of density and reflectance, or either of these characteristics.

Heretofore densitometers have been provided in which the light reflected from, or transmitted through, the article has been measured by the use of light-responsive devices but the light source has been supplied by the usual supply line. The light sensor or light-responsive means is thus operated under various levels of reflected or transmitted light thus leading to inaccurate measurements because of nonlinearity of the light sensors, or because of possible variations in the light source due to line voltage variations or aging of the lamp.

The present invention aims to overcome the difficulties and disadvantages of prior devices by providing a densitometer in which the light sensor or light-responsive means is operated at a constant light level.

In accordance with the invention this is accomplished by providing a variable light source with control means responsive to the reflected or transmitted light so that the light on the light sensor is maintained constant by varying the light source output. A separate sensor is used to measure the level of the light source which is read out by a meter appropriately calibrated to indicate reflectance or density values.

The construction in accordance with the invention is advantageous in that the use of inexpensive less sensitive light sensors may be used such as those made from silicon or selenium.

Other objects and advantages of the invention will be apparent from the following description and from the accompanying drawing which shows by way of example embodiments of the invention.

Figure 1:
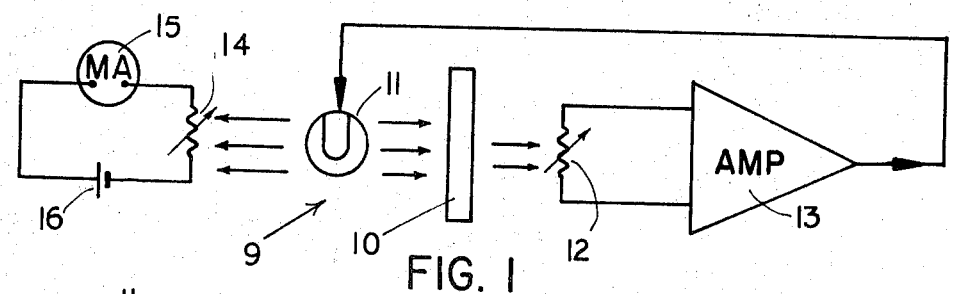
FIG. 1 is a block diagram of a densitometer in accordance with the invention.

Referring to the drawing there is shown in FIG. 1 a schematic drawing of a densitometer 9 in accordance with the invention. The structure shown in FIG. 1 is solely for measuring the optical density of an article 10 such as a photographic film. A variable light source 11 is positioned so as to direct light to the film 10. On the opposite side of the film 10 is a first light-responsive device 12 which may be a silicon or selenium photocell or cadmium sulfide or selenide photoresistors with its output connected to an amplifier 13. The amplifier 13 may include control means for varying the light source 11. Second light-responsive means 14 may also be a silicon or selenium photocell which is connected to suitable electric meter means 15 and a battery 16 so that the reading of the meter 15 is relative to the intensity of the light source 11.

In the operation of the densitometer shown in FIG. 1 light from the source 11 is passed through the film 10 and attenuated somewhat depending upon the optical density of the film 10. The attenuated light is impinged upon the first light cell 12 and by means of a suitable amplifier 13 caused to raise the intensity of the light source 11 so that the attenuated light reaching the first light cell 12 is the same as in the absence of the film 10. Thus the photocell 12 always receives the same amount of light (self-nulling). Therefore any suitable light cell may be used even one with a nonlinear response. The raise in intensity of the light source 11 is sensed by the photocell 14 and the magnitude of the increase in intensity is shown by the reading of the meter 15.

Figure 2:
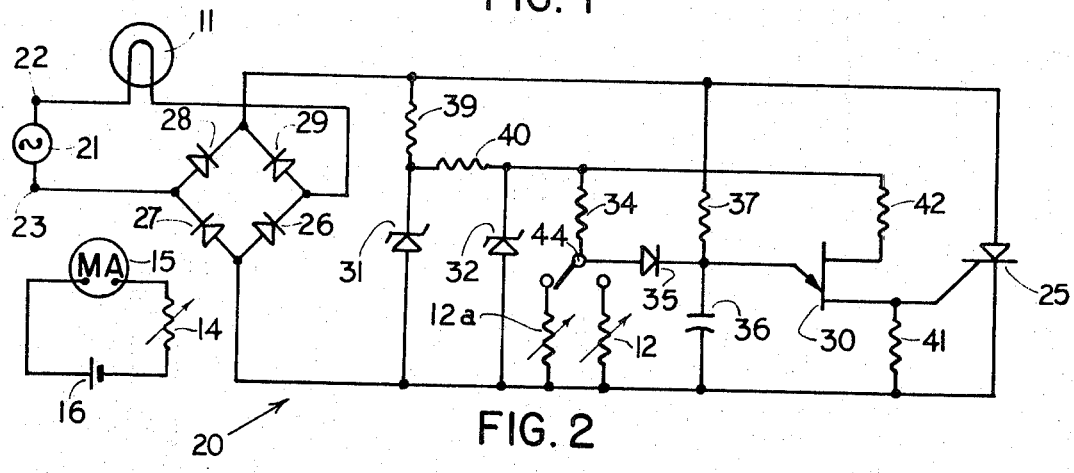
FIG. 2 is a schematic wiring diagram of an electrical circuit for the densitometer for use with an alternating current supply.

In FIG. 2 there is shown a schematic diagram of a suitable circuit 20 for the densitometer and which may be supplied from an alternating current supply 21 through terminals 22 and 23. The lamp 11 may be of the incandescent type and is controlled to produce a variable light output. Basically the lamp control circuit is an extended range full wave phase control circuit in which the photocell 12 controls the phase angle of triggering of a silicon controlled rectifier 25. This circuit is generally that described in the General Electric SCR Manual, fourth edition, on pages 191—193. The lamp 11 is connected across the a.c. line 22—23 in series with the bridge rectifier 26—29 thus permitting triggering on both halves of the a.c. cycle. The SCR 25 is connected across the bridge to control the light output of the lamp 11. Triggering of the SCR 12 is performed by unijunction transistor 30 having its B1 connected as an emitter follower for the control electrode of the SCR 25. B2 of the unijunction transistor 30 is connected to a clamped waveform supply provided by zener diodes 31 and 32. The zener 32 has a slightly lower zener voltage than zener 31 in order to hold the top of the clamped waveform flat. Resistor 34 in series with the photocell 12 forms a voltage divider which through diode 35 determines the charge on capacitor 36. Charging resistor 37 is provided to initially set system gain. Resistors 39 and 40 are voltage dropping resistors. Resistor 41 is used as a gate resistor and resistor 42 is a base-stabilizing resistor for the unijunction transistor 30. The circuit 20 of FIG. 2 may also include a third photocell 12a connected for alternate operation with the first photocell 12 by means of a double-throw switch 44. The use of the third photocell will be described in the operation of the densitometer shown in FIG. 4.

In the operation of the circuit 20 of FIG. 2 a variation in light impinging on the photocell 12 controls the angle of triggering of the SCR 25 and thus the light output of the lamp 11. The second photocell 14 and meter 15 of the circuit 20 operate as in the circuit 9 of FIG. 1 to provide an indication of the light output of the lamp 11.

Figure 3:
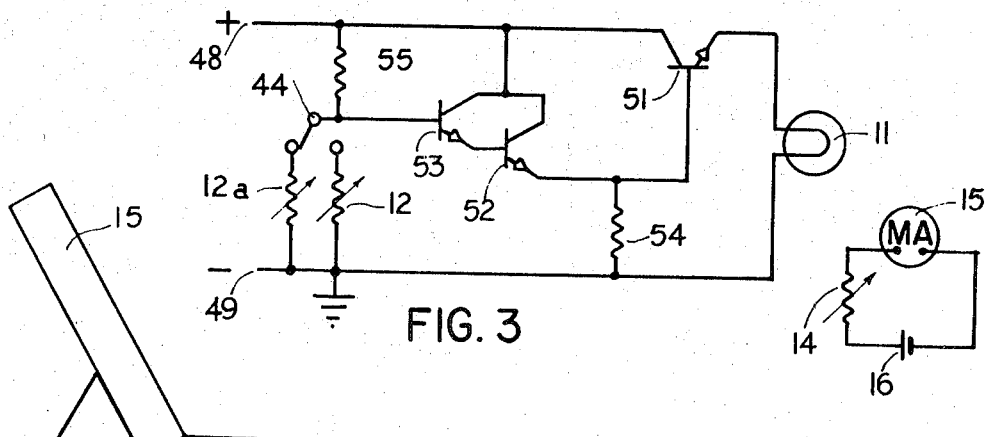
FIG. 3 is a schematic wiring diagram of an electrical circuit for the densitometer for use with a direct current supply.

In FIG. 3 there is shown a schematic diagram of another circuit 50 for the densitometer and which may be supplied from a direct current supply through terminals 48 and 49. In the circuit 50 the lamp 11 is controlled by the switching of a transistor 51 controlled by a Darlington connected amplifier including transistors 52 and 53. Resistor 54 is a collector load for the transistor 52. Resistor 55 connected in series with the photocell 12 provides a voltage divider for the control of the Darlington amplifier. Light variations sensed by the photocell 12 vary the resistance thereof and thus the potential applied to the base of the transistor 53, the end result being the control of light output of the lamp 11.

Figure 4:
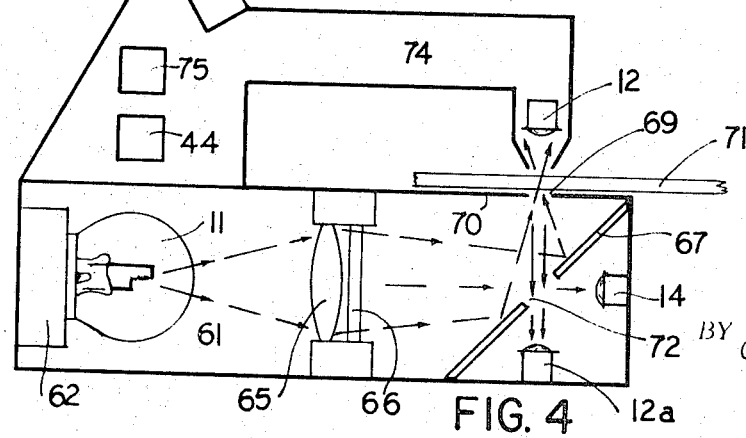
FIG. 4 is a schematic sectional drawing of the mechanical structure of the densitometer.

A suitable mechanical structure for the densitometer is shown in FIG. 4 and includes a housing 60 having a lighttight compartment 61 for the lamp 11 supported by a lamp base 62. A lens system 65 directs light through a filter system 66 to a mirror 67 positioned at an angle to reflect light upwardly through a light-transmitting window 69 in wall 70. Suitable supporting means 71 is provided to position an article such as photographic film or prints over the window 69. Advantageously the mirror 67 is apertured as indicated at 72 so that light from the lamp 11 may be impinged upon the photocell 14. The aperture 72 also provides a light path for light reflected from an article in the supporting means 71 to impinge upon the third photocell 12a.

The housing 60 extends upwardly to provide a chamber 74 in which is positioned the photocell 12. At any convenient place within the housing is located the electronic circuitry indicated by the block 75. At the upper end of the housing 60 is the meter 15 preferably positioned at an angle as indicated for ease in reading.

The densitometer may be arranged to provide either reflectance or density readings or both type readings. In using the densitometer for reflectance readings the double-throw switch 44 is moved to the position to connect the photocell 12a in the circuit. In this case light from the lamp 11 is passed through the lens 65, the filter 66, reflected by the mirror 67 to the article in the supporting means 71. Reflected light from the article is directed through the aperture 72 to the photocell 12a. Control is had of the light output and the increased intensity of the light readon the meter 15 calibrated to show the reflectance of the article.

In using the densitometer for density readings the double-throw switch 44 is moved into position to connect the photocell 12 into the circuit and disconnect the photocell 12a. The reading of the meter 15 will then be relative to light transmitted through the article.

From the foregoing description it will be seen that a densitometer is provided capable of making reflectance or density measurements. Obviously by omitting certain parts the device may be constructed for making either reflectance or density readings.

While the invention has been described and illustrated with reference to specific embodiments thereof, it will be understood that other embodiments may be resorted to without departing from the invention. Therefore, the form of the invention set out above should be considered as illustrative and not as limiting the scope of the following claims.

I claim:

1. A densitometer comprising supporting means for an article to be subjected to light so that the article provides a field of view, a possibly variable light source for illuminating said article, first light-responsive means actuated by light from said field of view, control means for said possibly variable light source actuated by said first light-responsive means so that the light output is kept constant, second light-responsive means actuated by light from said light source, and indicating means for said second light-responsive means whereby a reading of said indicating means is related to the intensity of light from said field of view.

2. A densitometer according to claim 1 in which said supporting means is a film holder.

3. A densitometer according to claim 1 in which said first light-responsive means is actuated by light passed through said article.

4. A densitometer according to claim 1 in which said first light-responsive means is actuated by light reflected from said article.

5. A densitometer according to claim 1 in which said control means includes an amplifier, and output means for the amplifier being connected to control said possibly variable light source so that the light output is kept constant.

6. A densitometer according to claim 1 in which said indicating means is an electric meter.

7. A densitometer according to claim 1 in which a mirror is provided and positioned to reflect light from said variable light source to said article, said first light-responsive means being positioned on one side of said article and said mirror being positioned on the other side of said article so that said first light-responsive means is actuated by light passed through said article.

8. A densitometer according to claim 1 in which an apertured mirror is provided and positioned to reflect light from said variable light source to said article, said first light-responsive means being positioned behind said mirror in alinement with said article through said aperture so that said first light-responsive means is actuated by light reflected from said article.

9. A densitometer according to claim 1 in which an apertured mirror is provided, and a third light-responsive means is provided and positioned in alinement with said article through said mirror aperture so that said third light-responsive means is actuated by light reflected from said article, and dual position switching means is provided operative to selectively connect said first or said third light-responsive means to said control means.

10. A densitometer comprising a film holder adapted to receive a film, a possibly variable light source for illuminating a film in said film holder, first light-responsive means positioned to receive light transmitted through a film in said film holder, amplifier means for the output of said first light-responsive means, control means for said variable light source actuated by the output of said amplifier so that the light output is kept constant, second light-responsive means actuated by light from said light source, and electric meter means connected to said second light-responsive means whereby a reading of said meter is related to the intensity of light passed through said film.